United States Patent [19]

Kaplan et al.

[11] Patent Number: 4,903,230

[45] Date of Patent: Feb. 20, 1990

[54] REMOTE TERMINAL ADDRESS AND BAUD RATE SELECTION

[75] Inventors: Jay Kaplan, Wayland; Richard G. Harris, Franklin; Barry Sidebottom, Marlboro, all of Mass.

[73] Assignee: Bull HN Information Systems Inc., Billerica, Mass.

[21] Appl. No.: 214,893

[22] Filed: Jun. 29, 1988

Related U.S. Application Data

[63] Continuation of Ser. No. 726,294, Apr. 24, 1985, abandoned, which is a continuation of Ser. No. 665,511, Oct. 31, 1984, abandoned, which is a continuation of Ser. No. 277,783, Jun. 26, 1981, abandoned.

[51] Int. Cl.⁴ .............................................. G06F 9/02
[52] U.S. Cl. .................................................. 364/900
[58] Field of Search ............... 364/200, 900, 403, 420, 364/422, 708; 340/531, 825.06–825.08, 825.16, 825.29

[56] References Cited

U.S. PATENT DOCUMENTS

| | | | |
|---|---|---|---|
| 3,676,858 | 7/1972 | Finch et al. | 364/200 |
| 3,676,860 | 7/1972 | Collier et al. | 364/200 |
| 3,889,236 | 6/1975 | Herger et al. | 364/200 |
| 3,993,981 | 11/1976 | Cassarino, Jr. et al. | 364/200 |
| 4,031,371 | 6/1977 | De Vries | 364/708 |
| 4,052,702 | 10/1977 | Smith et al. | 364/200 |
| 4,075,691 | 2/1978 | Davis et al. | 364/200 |
| 4,091,449 | 5/1978 | Meckstroth et al. | 364/466 |
| 4,188,664 | 2/1980 | DeShon | 364/200 |
| 4,195,344 | 3/1980 | Yamazaki | 364/200 |
| 4,334,126 | 6/1982 | Slingsby | 364/900 |
| 4,425,628 | 1/1984 | Bedard et al. | 364/900 |
| 4,454,596 | 6/1984 | Wunsch et al. | 364/900 |

*Primary Examiner*—David L. Clark
*Attorney, Agent, or Firm*—George Grayson; John S. Solakian; Gary D. Clapp

[57] ABSTRACT

In a computer terminal an electronic device allows the selection of the terminal address and baud rate via a DIP switch (Dual In-Line Package) located internally in the terminal or via external selection means by allowing the setting of signal line voltage level by means of jumper wires in a communication connector. To enable the external option, predetermined pins in the communications connector are jumpered to disable the DIP switch, whose settings are then ignored. By jumpering other predetermined pins in the communications connector, the signal line levels define the terminal address and the terminal baud rate.

7 Claims, 8 Drawing Sheets

| PINS | NAME | FUNCTION |
|---|---|---|
| 1 | FG | FRAME GROUND |
| 2 | TD | TRANSMITTED DATA |
| 3 | RD | RECEIVED DATA |
| 4 | RTS | REQUEST TO SEND |
| 5 | CTS | CLEAR TO SEND |
| 6 | NOT CURRENTLY USED | |
| 7 | SG | SIGNAL GROUND |
| 8 | DCD | DATA CARRIER DETECT |
| 9 | NOT CURRENTLY USED | |
| 10 | NOT CURRENTLY USED | |
| 11 | NOT CURRENTLY USED | |
| 12 | NOT CURRENTLY USED | GROUND USED FOR ADDRESS & BAUD SELECTION |
| 13 | GND | |
| 14 | SWCOM | SWITCH DISABLE |
| 15 | +5V | SWITCH DISABLE |
| 16 | NOT CURRENTLY USED | |
| 17 | NOT CURRENTLY USED | |
| 18 | NOT CURRENTLY USED | |
| 19 | RB | REMOTE BAUD SELECTION |
| 20 | DTR | DATA TERMINAL READY |
| 21 | RAB1 | REMOTE ADDRESS BIT 1 |
| 22 | RAB2 | REMOTE ADDRESS BIT 2 |
| 23 | RAB3 | REMOTE ADDRESS BIT 3 |
| 24 | RAB4 | REMOTE ADDRESS BIT 4 |
| 25 | NOT CURRENTLY USED | |

| PINS | NAME | FUNCTION |
|---|---|---|
| 1 | FG | FRAME GROUND |
| 2 | TD | TRANSMITTED DATA |
| 3 | RD | RECEIVED DATA |
| 4 | RTS | REQUEST TO SEND |
| 5 | CTS | CLEAR TO SEND |
| 6 | NOT CURRENTLY USED | |
| 7 | SG | SIGNAL GROUND |
| 8 | DCD | DATA CARRIER DETECT |
| 9 | NOT CURRENTLY USED | |
| 10 | NOT CURRENTLY USED | |
| 11 | NOT CURRENTLY USED | |
| 12 | NOT CURRENTLY USED | |
| 13 | GND | GROUND USED FOR ADDRESS & BAUD SELECTION |
| 14 | SWCOM | SWITCH DISABLE |
| 15 | +5V | SWITCH DISABLE |
| 16 | NOT CURRENTLY USED | |
| 17 | NOT CURRENTLY USED | |
| 18 | NOT CURRENTLY USED | |
| 19 | RB | REMOTE BAUD SELECTION |
| 20 | DTR | DATA TERMINAL READY |
| 21 | RAB1 | REMOTE ADDRESS BIT 1 |
| 22 | RAB2 | REMOTE ADDRESS BIT 2 |
| 23 | RAB3 | REMOTE ADDRESS BIT 3 |
| 24 | RAB4 | REMOTE ADDRESS BIT 4 |
| 25 | NOT CURRENTLY USED | |

*FIG. 7*

| WIRE NO. | FROM CONNECTOR NO. | FROM PIN NO. | TO PIN NO. | |
|---|---|---|---|---|
| 1 | J1 | 8 | PIN 4 | |
| 2 | | 20 | 5 | |
| 3 | | 5 | 6 | |
| 4 | | 4 | 7 | |
| 5 | | 3 | 9 | |
| 6 | | 7 | 10 | |
| 7 | | 2 | 11 | |
| 8 | | 1 | PIN 12 | |
| | | | CONNECTOR NO. | PIN NO. |
| 9 | | 15 | P16 | 1 |
| 10 | | 14 | | 2 |
| 11 | | 13 | | 4 |
| 12 | | 19 | | 5 |
| 13 | | 24 | | 6 |
| 14 | | 23 | | 7 |
| 15 | | 22 | | 8 |
| 16 | J1 | 21 | P16 | 9 |

*FIG. 8*

| ADDRESS* | JUMPER PIN 13 TO PIN: | | | |
| --- | --- | --- | --- | --- |
| | 21 | 22 | 23 | 24 |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |
| A | | X | | X |
| B | X | X | | X |
| C | | | X | X |
| D | X | | X | X |
| E | | X | X | X |
| F | X | X | X | X |

*ADDRESS "0" NOT VALID

FIG. 9

REMOTE TERMINAL ADDRESS AND BAUD RATE SELECTION

This is a continuation of application Ser. No. 726,294 filed on Apr. 24, 1985, which is a continuation of application Ser. No. 665,511 filed Oct. 31, 1985, which is a continuation of application Ser. No. 277,783, filed June 26, 1981, all now abandoned.

Apparatus for Processing Data Transfer Requests in a Data Processing System, issued as a patent on Nov. 23, 1976, and having U.S. Pat. No. 3,993,981.

BACKGROUND OF THE INVENTION

1. Field of the Invention

This invention relates to computer terminal apparatus, and more particularly to the factory data collection terminal.

2. Description of the Prior Art

Factory data collection terminals are generally installed in factory areas for use of personnel to enter information pertaining to the operation of the factory. For example, they may be placed in unattended areas in the factory for use by production workers in recording the starting or stopping of a job. They can be utilized for inventory control or to provide the database for payroll calculations. Generally the areas in which such factory data collection terminals are located are quite dirty as compared to office areas, banking operations, and other similar type of commercial operations. Accordingly such data collection terminals are enclosed in dustproof packages.

A typical prior art unit is shown on FIG. 1. A dustproof enclosure 101 protects the internal mechanism from dirt, dust, grease and other harmful contaminants in the atmosphere. The unit is designed to be mounted against a wall or post via mounting brackets 103. Information may be entered into the unit via keyboard switches 102 or via card reader slot 106. Power, data signals and address signals are provided to the unit via a conduit 104 encasing wires 105, as shown in the cutaway of FIG. 1. Many such units may be placed at various locations in the factory. They are all interconnected, generally into a main computer system which is remotely located. Each unit can provide information for storage or processing by the computer system. In order to identify the source of information, each factory data collection unit has an address by which it is identified. Each data collection unit also has its own baud rate for transmitting information to the central processing system or receiving information from it. The baud rate of one unit may be different from another unit. A problem arises when maintenance is required of any of these data collection units. By removing the enclosure 101 in order to diagnose and correct a problem, the internal mechanism is exposed to contaminants and untrained maintenance personnel which can cause other more severe problems. Accordingly, it is desirable to remove the entire factory data collection unit without exposing any of the internal mechanisms and replace it with another operable unit. The inoperable unit would then be sent to a central maintenance depot, repaired and returned. Under the prior art arrangements, it was not possible to remove the entire unit without in some manner exposing the internal mechanism to the factory contaminants.

What was required was a special enclosure housing all the various connecting circuits which could be removably attached to the factory data collection terminal, and which could be opened to the factory atmosphere to permit the removal of the data collection hermeticallY sealed terminal After removal of the inoperable data collection terminal, what was further required was to have it replaced with an operable one until the original data terminal was repaired at a centrally located maintenance depot and returned, again without exposing the internal operating mechanisms of the data terminal. What was further required was to retain the same identification address for the special connector as the inoperable terminal. Since each data collection terminal has its own identification address, it was necessary to have the address of the replacement unit disabled via means located in the connector and to set the address of the disabled terminal again by means located in the connector so that any other unit in the system addressing the new terminal utilizing the old address would be able to communicate with the new terminal as if it were the old terminal.

Another problem in replacing an inoperable terminal with an operable one was that the baud rate of sending signals may be different than the terminal replaced Accordingly, another requirement of an improved connector was means in the connector for selecting different baud rates.

OBJECTS OF THE INVENTION

It is a primary object of the invention, therefore, to provide an improved, remote (external to the unit) terminal address and baud rate selection.

It is another object of the invention to provide an improved data collection terminal electrical enclosure which would permit the removal and replacement of the data collection terminal without exposing the internal mechanism of such data collection terminal to the atmosphere.

It is another object of the invention to provide an improved terminal address selection means located external to the terminal unit.

It is still another object of the invention to provide a terminal baud rate selection means for a terminal unit, which selection means is located external to the terminal.

Yet another object of the invention is to provide a terminal electrical connector for a terminal which defines the address of the terminal.

SUMMARY OF THE INVENTION

In accordance with the above and other objects of the invention, remote terminal address and baud rate selection means are provided within a communication connector which optionally allows the selection of the terminal address and baud rate to be accomplished by an internal DIP (Dual In-Line Package) switch or externally in the communications connector.

The selection option within the data collection terminal involves setting five DIP switches (four for address and one for baud rate) to set signal lines to logic 1 or logic 0.

The invention provides external selection means in the communications connector which permits the setting of these signal line levels to be accomplished via jumper wires in the communications connector. To enable the external option, two pins in the communications connector are jumpered to disable the DIP switch, whose settings are then ignored. The jumpering of other pins in the communications connector defines the signal line levels to define terminal address and baud rate.

BRIEF DESCRIPTION OF THE DRAWINGS

FIG. 7 identifies the pins shown in FIG. 6 and their function.

FIG. 8 identifies the wire number and the connector and pin numbers associated with each wire internally and externally to the data collection terminal.

FIG. 9 is a diagram showing the jumpering of various wires in the electrical communications connector to address a unit via means external to the data collection terminal.

DESCRIPTION OF THE PREFERRED EMBODIMENT OF THE INVENTION

Figure 1:
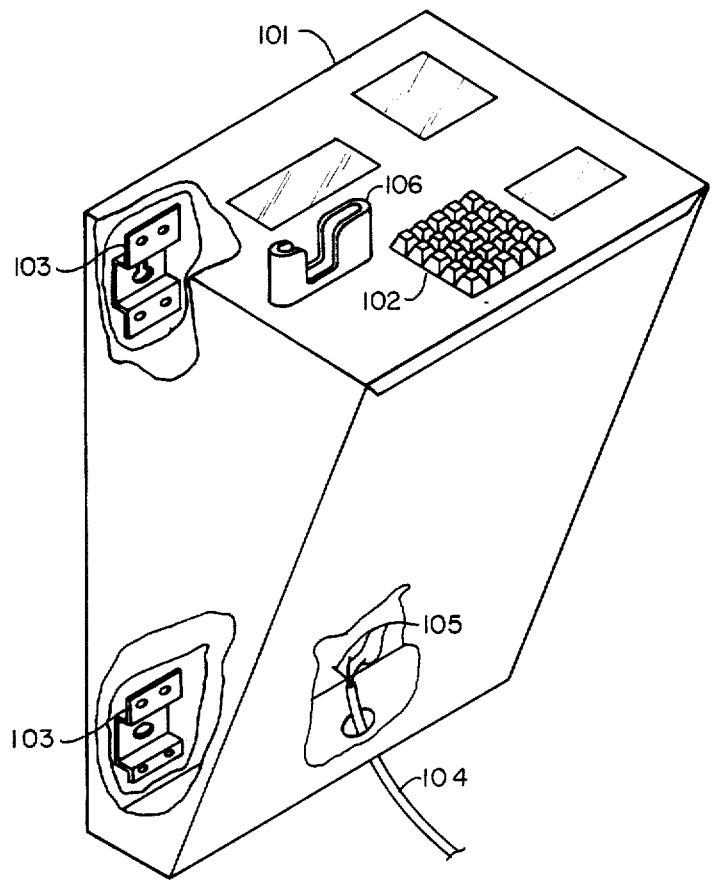
FIG. 1 is a prior art, three-dimensional view of a factory data collection terminal.

Referring now to FIG. 1, there is shown a prior art factory data collection terminal. An integral enclosure 101 houses the electronic circuits and other mechanisms for the factory data collection terminal. The data collection terminal is designed to be mounted on a wall or post via mounting brackets 103. Power, data signals and address signals are provided via wires 105 which are housed in a conduit 104 directly connected to the enclosure of a factory collection terminal. It should be noted that in order to mount the unit on the wall it is necessary to remove the enclosure, thus exposing the internal wiring mechanisms to any contaminants that may be present in the atmosphere and untrained personnel.

Figure 2:
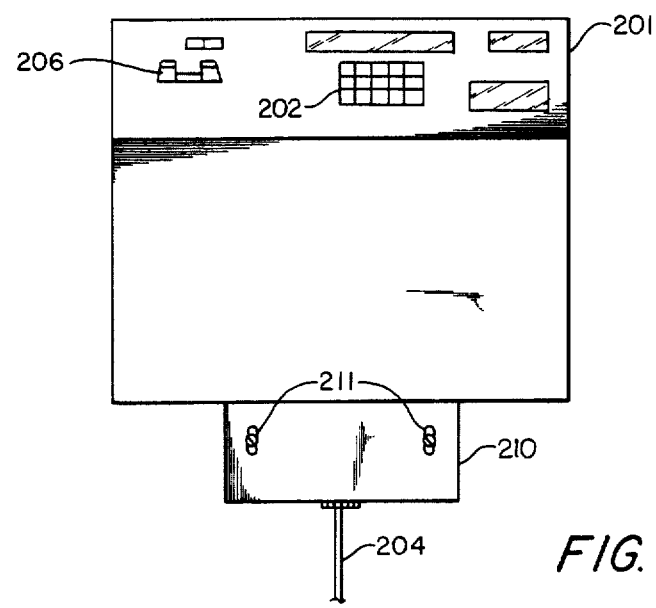
FIG. 2 is a front elevation view of the invention.
Figure 3:
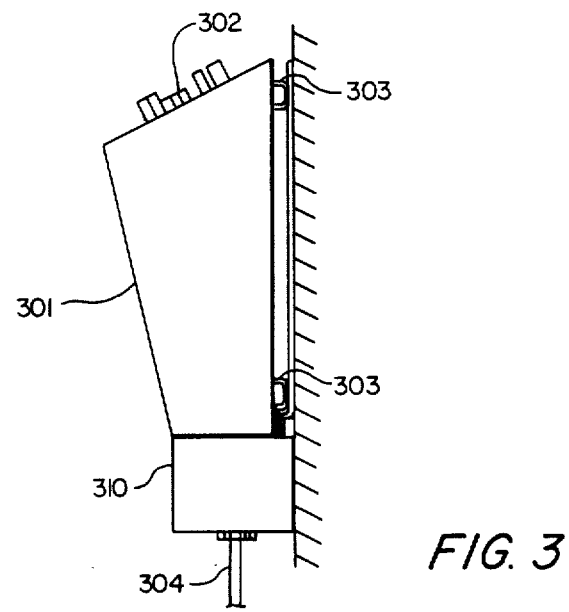
FIG. 3 is a side elevation view of the invention.
Figure 4:
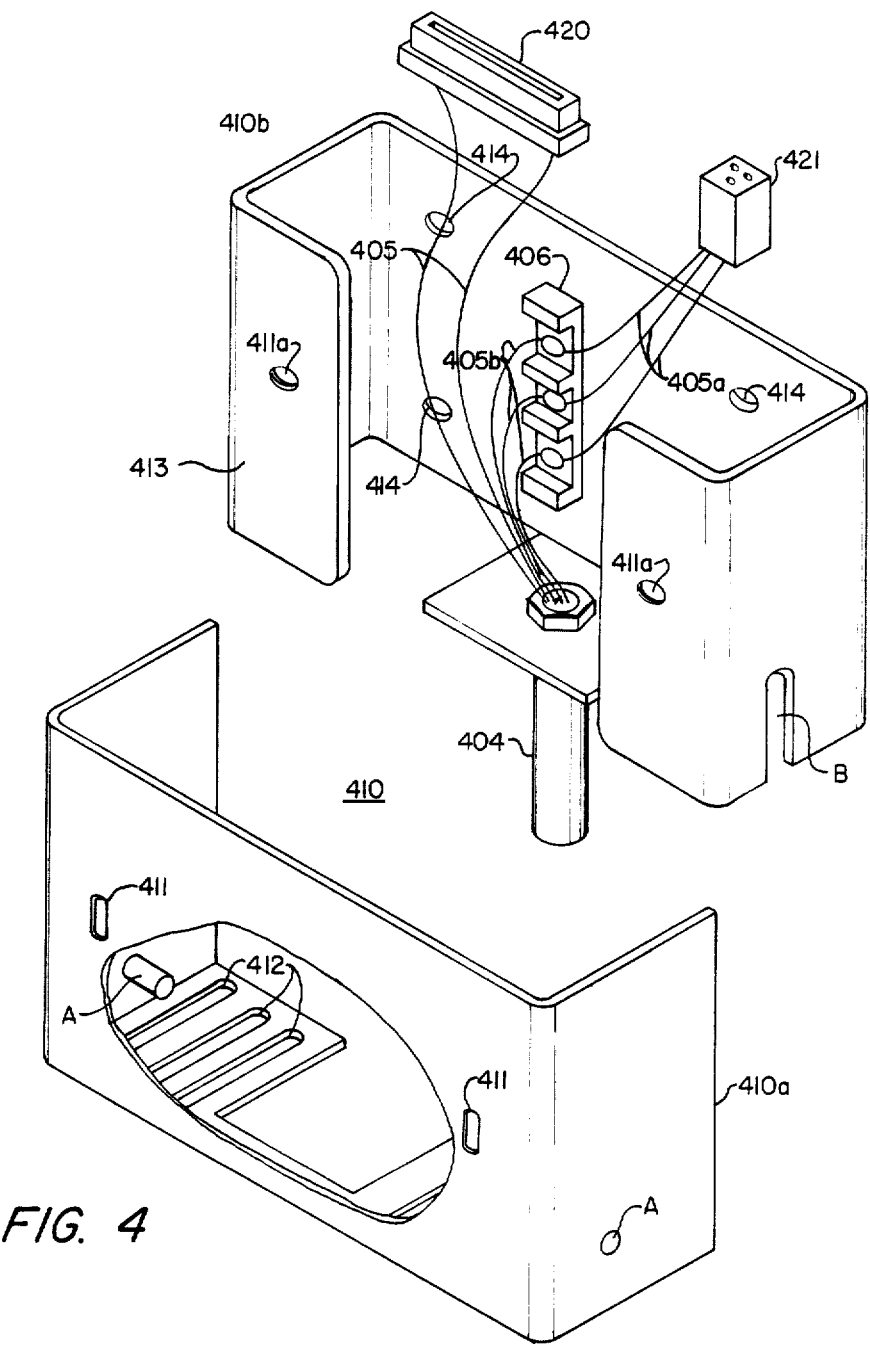
FIG. 4 is an exploded view of the factory data collection terminal electrical connector.

Referring now to FIGS. 2, 3 and 4, there is shown the invention wherein a special electrical enclosure unit 210, 310, 410 is removably attached below the factory data collection terminal 201, 301. Power is provided to the data collection terminal via wires 405a and 405b, utilizing terminal board 406 and power plug 421. Data signals and address signals are provided to the data collection terminal via wires 405 and electric plug 420. These wires are housed in a conduit 404, which is removably connected to the electrical enclosure unit 410. To prevent interference between signals, the wires are shielded by standard shielding means. The power plug 421 and the data and address signal plug 420 are removably connected to the data collection terminal unit 201, 301. It will be noted that a removable face plate 410a of enclosure 210, 310 has air vents 412 for ventilation of the enclosure unit. The back plate of enclosure 210, 310, 410b has mounting holes 414 so that the back plate unit can be permanently mounted to a wall or post. The front plate unit is attached to the back plate unit via slotted holes 411 and 411a, pins A and slots B. This allows the front plate to have vertical adjustment and to prevent unauthorized access to wiring by sliding up to touch the bottom of the terminal. Thus all the internal connecting mechanisms and circuits can be opened for connecting or disconnecting the data collection terminal via the connecting circuitry. However, in connecting or disconnecting the data collection terminal through the electrical connecting unit, it is not necessary to open and expose any of the interior mechanisms of the data collection terminal. The data collection terminal can be mounted or dismounted via the mounting brackets 303 external to the data collection unit.

Figures 5, 6:
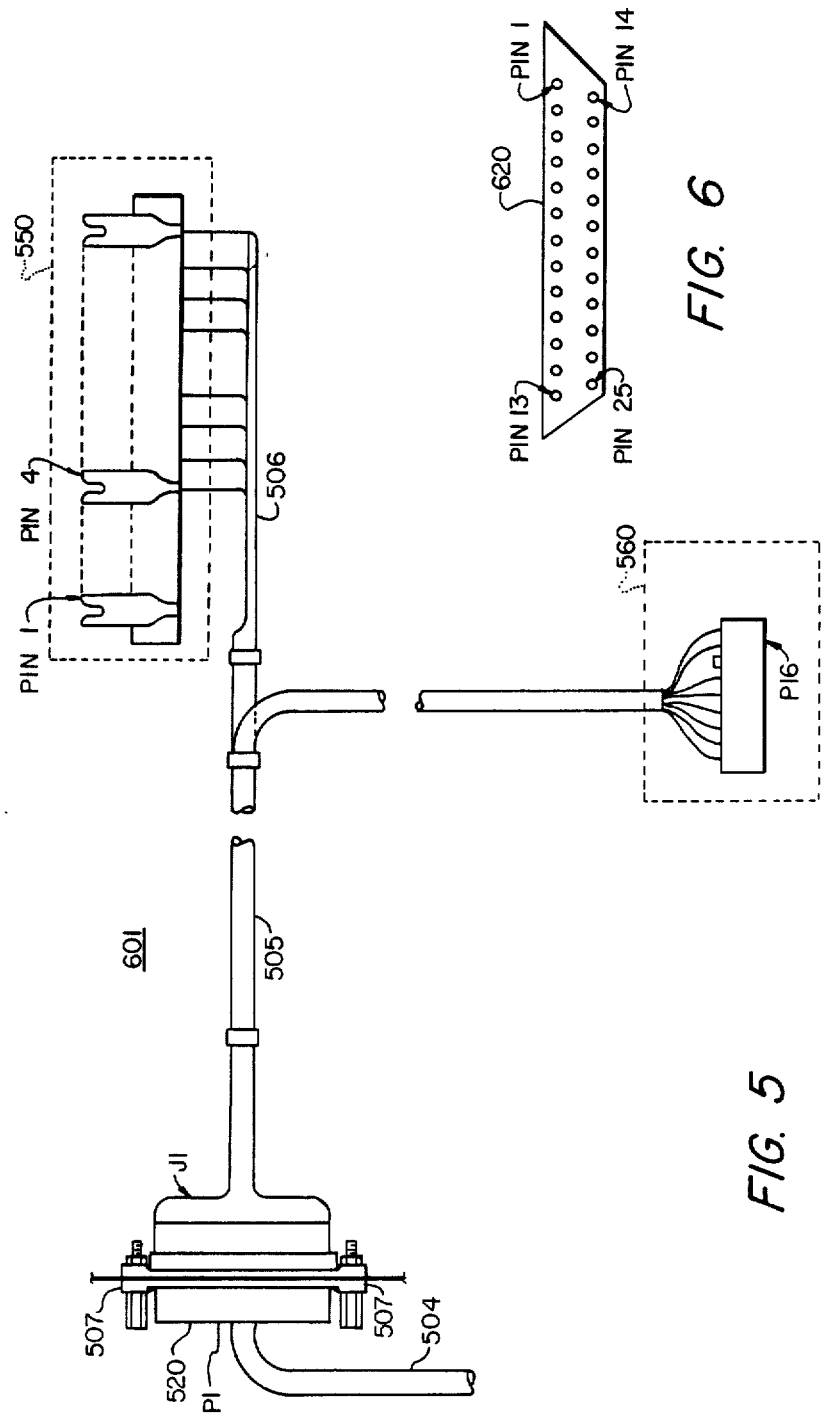
FIG. 5 is a schematic diagram of the wiring of the invention located within the data collection terminal.
FIG. 6 is a schematic diagram of the pin arrangement and numbering in the external communication connector.

Referring now to FIG. 5, the connector J1 is mounted from the inside of the data collection terminal 601. (The external portion of the data collection terminal 601 is shown on FIGS. 2 and 3, 201, 301.) An internal cable from J1 (505, 506) includes wires which lead to pin assembly 550 and also lead to connector P16 in connector terminal assembly 560. An external connector P1 is attached to the data collection terminal via bolts 507. A conduit 504 houses the address and data lines which terminate in connector 620 of FIG. 6. It should be noted that the pins in connector 620 are shown in plain view and are numbered from pin 1 through pin 13 on the top row and from pin 14 to pin 25 on the bottom row.

Referring to FIG. 8, there is shown various columns identified as wire number, connector number and pin number. For example, wire number 1 has one end attached to pin number 8 of connector J1, and the other end attached to pin 4 in pin assembly 550. Similarly wire number 9 has one end coupled to pin number 15 of connector J1, while the other end is coupled to pin number 1 (not shown) of connector P16. Utilizing this example, the remaining wires can similarly be traced.

Referring now to FIG. 7, various pins of terminal cable connection 620 are identified by name and function. For example, pin number 1 is the FG or frame ground pin, whereas pin number 8 is the DCD or data carrier detect pin.

Figure 10:
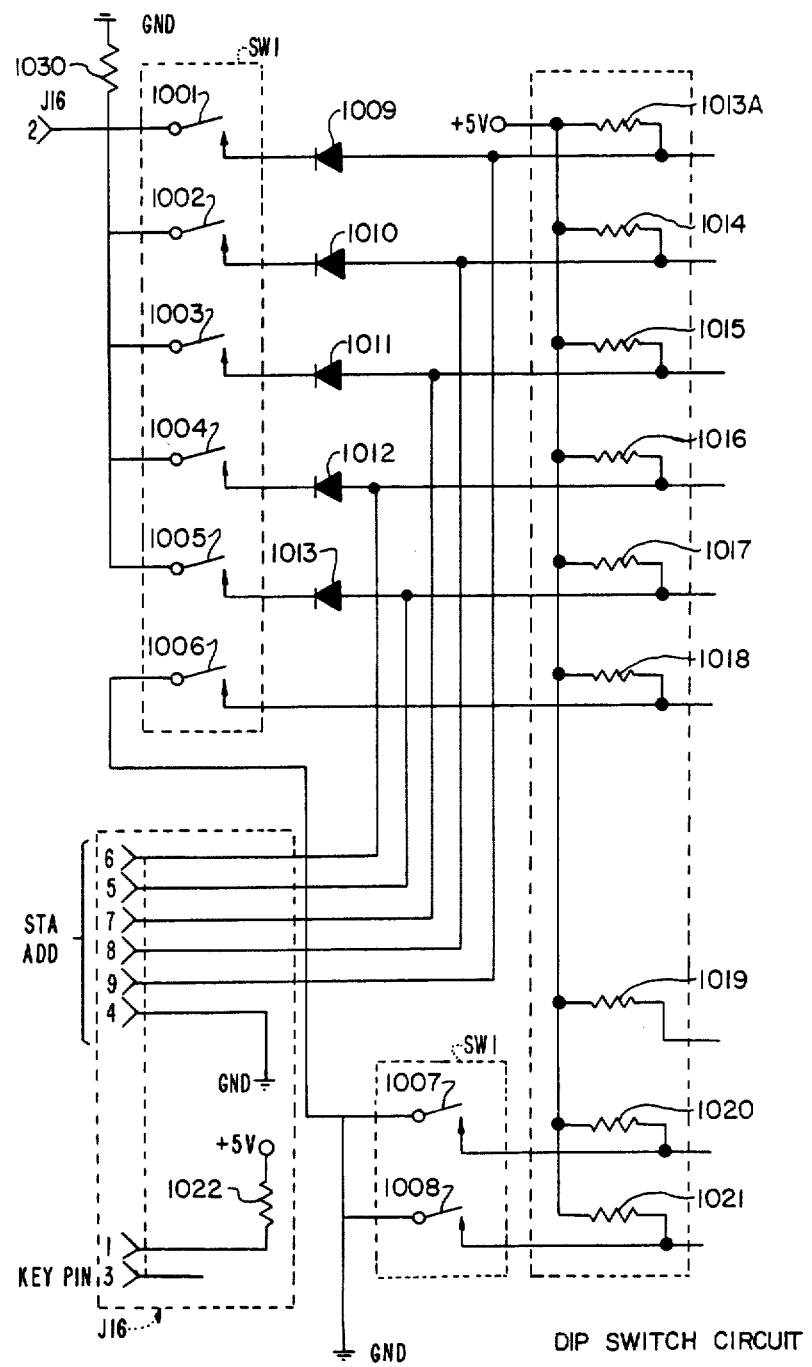
FIG. 10 is a schematic diagram showing the DIP switches within the factory data collection terminal.

In addition to the circuitry shown on FIG. 5 which is internal to the factory data collection terminal, there is also the DIP switches (Dual In-Line Package) shown on FIG. 10 which are also internal to the factory data collection terminal. Referring to FIG. 10, there is shown the DIP switch SW1 which comprises switches 1001 through 1008. One terminal each of switches 1001 through 1005 is coupled to pin 2 in connector J16 and to ground through resistor 1030. The other terminal of switch 1001 is coupled to diode 1009, and each switch 1002 through 1005 being similarly coupled to a respective diode 1010–1013. Additionally, diodes 1009 through 1012 are coupled to resistors 1013 through 1017 respectively. One terminal of switches 1006 through 1008 are additionally coupled to ground. The other terminal of switches 1006, 1007 and 1008 respectively are coupled to resistors 1018, 1020 and 1021. Switch 1001 is coupled to pin 9 of connector J16; switch 1002 is coupled to pin 8 of connector J16. Pin 1003 is coupled to pin 7 of connector J16. Switch 1004 is coupled to pin 6 of connector J16; switch 1005 is coupled to pin 5 of connector J16. Pin 1 is coupled to a 5 volt supply through resistor 1022; whereas pin 4 is coupled to ground. Pin 3 is a keying pin (no connection); i.e., the pin is cut off and the mating connector socket filled so as to ensure that the mating connector is installed correctly (common practice). It should be noted that connector J16 mates with connector P16 on FIG. 5.

The address of any data collection terminal is set internally via opening or closing switches. When the switch is closed, this can represent a binary 1; whereas when the switch is opened, it can represent a binary 0.

For example, assume that the factory data collection terminal has address 7. According to the convention adopted, this would be represented internally by setting switches 1001, 1003 and 1002 to a closed position and leaving switch 1004 open. This gives binary 0111 equal to decimal 7.

Assuming further that this unit is removed and replaced by another unit which has been set with different address, it is necessary that this replacement unit have the same old address number 7. This can be accomplished externally by jumpering wires shown in connector 420, 520, 620 on FIGS. 4, 5 and 6 respectively. This jumpering is accomplished in accordance with FIG. 9. FIG. 9 provides addresses by jumpering pin 13 to a combination of pins 21, 22, 23 or 24 as shown in FIG. 9. First, however, the address and baud rate DIP switches inside the replacement unit must be disabled. This is accomplished by jumpering pin 14 to 15. In order to change address then, pin 13 is jumped to some combination of pins 21, 22, 23 or 24. For example, in order to obtain address 7, pin 13 is jumped to pin 21, 22 and 23.

The baud rate can also be changed by jumping pins. This is accomplished as follows. In order to obtain a 1200 baud rate, pin 13 is jumped to pin 19. In order to obtain a 2400 baud rate, no jumper is necessary.

It should be noted, therefore, that both addresses and baud rate changes can be made externally to any unit attached to the electrical connector unit.

Having shown and described one embodiment of the invention, those skilled in the art will realize that many variations and modifications can be made to produce the described invention and still be within the spirit and scope of the claimed invention. It is the intent therefore, that the invention be limited only as indicated by the scope of the claims.

What is claimed is:

1. An apparatus comprising a remote terminal of a data processing system, the terminal having electronic means positioned in and generally inaccessible within a terminal housing, the electronic means comprising a plurality of individual lines selectively closed by preset means inaccessible within the terminal housing to select the terminal address and baud rate, the terminal further comprising apparatus for selecting for said terminal an alternative address and an alternative baud rate without access into the terminal housing by interconnection of external leads of the apparatus to the individual lines of the electronic means with jumpers, said apparatus comprising:
   (a) first means for disabling said electronic means for selecting the terminal address and baud rate by means of voltage applied to said individual lines with said interconnection with jumpers of external leads to the individual lines of the electronic means;
   (b) second means for selecting said terminal address by means of voltage applied to said individual lines with said interconnection with jumpers of external leads to the individual lines; and
   (c) third means for selecting said baud rate by means of voltage applied to said individual lines with said interconnection with jumpers of external leads to the individual lines.

2. The apparatus as recited in claim 1 comprising a connector assembly having pins terminating the external leads, the pins being interconnected by jumpers to interconnect said leads.

3. In a remote terminal of a data processing system, the terminal having electronic means positioned in and generally inaccessible within a terminal housing for selecting the terminal address and baud rate and a connector assembly having connector pins providing leads to the terminal external to the terminal housing, a method for alternatively selecting said terminal address and baud rate comprising:
   (a) providing in the electronic means a plurality of individual lines selectively closed by preset means inaccessible within the terminal housing to set the terminal address and baud rate, the preset means being disabled by coupling a predetermined potential to a first pin of the pins of the connector and the individual lines being connected to respective individual ones of the pins;
   (b) disabling said electronic means by jumpering one of the pins of the connector to the first pin to apply the predetermined potential to the first pin of the connector; and
   (c) selecting said terminal address and baud rate by jumpering at least one of the pins to other of the pins of the connector which individually connected to the plurality of individual lines of the electronic means.

4. A method as recited in claim 3 wherein the electronic means for selecting the terminal address and baud rate comprises a plurality of switches connected between respective first terminals and ground, and wherein the electronic means is disabled by jumpering a pin having a voltage thereon to a pin which is connected between the plurality of switches and ground, and the terminal address and baud rate are selected by jumpering a pin connected to ground to selected pins connected to said respective first terminals of the switches.

5. A remote terminal of a data processing system, the terminal comprising a housing and a connector assembly having external connector pins providing leads to the housing and having electronic means positioned in and generally inaccessible within the terminal housing for selecting the terminal address, the electronic means comprising a plurality of individual lines selectively closed by preset means inaccessible within the terminal housing, each preset means being coupled with a semiconductor device to form a series circuit between an address bit node and ground, each address bit node being coupled to an external address pin of the connector to the terminal, the connector further comprising external pins coupled to predetermined potentials and an external pin coupled to each series circuit including the preset means and semiconductor device, each of the series circuits being disabled by jumpering pins of the connector to apply a predetermined potential to the pin coupled to the series circuits, the predetermined potential changing the operating state of the semiconductor device, and the electronic means resetting the address of the terminal with jumpering of the pin of a predetermined potential to selected ones of the pins connected to the address nodes.

6. A remote terminal as claimed in claim 5 wherein the semiconductor devices are diodes connected in series with the preset means between the address nodes and the disabling pin, the terminal further comprising a resistance coupled between the disabling pin and ground.

7. A remote terminal as claimed in claim 6 wherein the preset means are switches.